US011545039B2

(12) United States Patent
Ortman

(10) Patent No.: US 11,545,039 B2
(45) Date of Patent: Jan. 3, 2023

(54) SYSTEMS AND METHODS FOR CONTROLLING AN INTERSECTION OF A ROUTE OF AN UNMANNED AERIAL VEHICLE

(71) Applicant: Ford Global Technologies, LLC, Dearborn, MI (US)

(72) Inventor: Richard Ortman, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 16/940,614

(22) Filed: Jul. 28, 2020

(65) Prior Publication Data

US 2022/0036747 A1 Feb. 3, 2022

(51) Int. Cl.
*G08G 5/00* (2006.01)
*G05D 1/10* (2006.01)
*H04W 4/021* (2018.01)

(52) U.S. Cl.
CPC ........... *G08G 5/0069* (2013.01); *G05D 1/106* (2019.05); *G08G 5/0026* (2013.01); *G08G 5/0039* (2013.01); *H04W 4/021* (2013.01)

(58) Field of Classification Search
CPC .. G08G 5/0069; G08G 5/0026; G08G 5/0039; G08G 5/0013; G08G 5/0052; G08G 5/006; G05D 1/106; G05D 1/0055; H04W 4/021; B64C 39/024; B64C 2201/024; B64C 2201/12; B64C 2201/146
See application file for complete search history.

(56) References Cited

U.S. PATENT DOCUMENTS

| | | | |
|---|---|---|---|
| 2018/0075759 A1* | 3/2018 | Kim | G08G 1/096827 |
| 2019/0197890 A1 | 6/2019 | Du et al. | |
| 2019/0295426 A1 | 9/2019 | Nilsson et al. | |
| 2019/0311327 A1 | 10/2019 | Habbaba et al. | |
| 2020/0126413 A1* | 4/2020 | Sham | B64C 39/024 |
| 2021/0103299 A1* | 4/2021 | Zhou | G08G 1/166 |

OTHER PUBLICATIONS

B. Shang, L. Liu, J. Ma and P. Fan, "Unmanned Aerial Vehicle Meets Vehicle-to-Everything in Secure Communications," in IEEE Communications Magazine, vol. 57, No. 10, pp. 98-103, Oct. 2019.

* cited by examiner

*Primary Examiner* — Alan D Hutchinson
(74) *Attorney, Agent, or Firm* — Brandon Hicks; Eversheds Sutherland (US) LLP

(57) ABSTRACT

The disclosure provides systems and methods for controlling an intersection of a route of a UAV. The systems and methods provide detection of vehicles and persons in (or predicted to enter) an area of the intersection and provide a signal to the UAV so that the UAV can avoid flying over vehicles and persons.

18 Claims, 2 Drawing Sheets

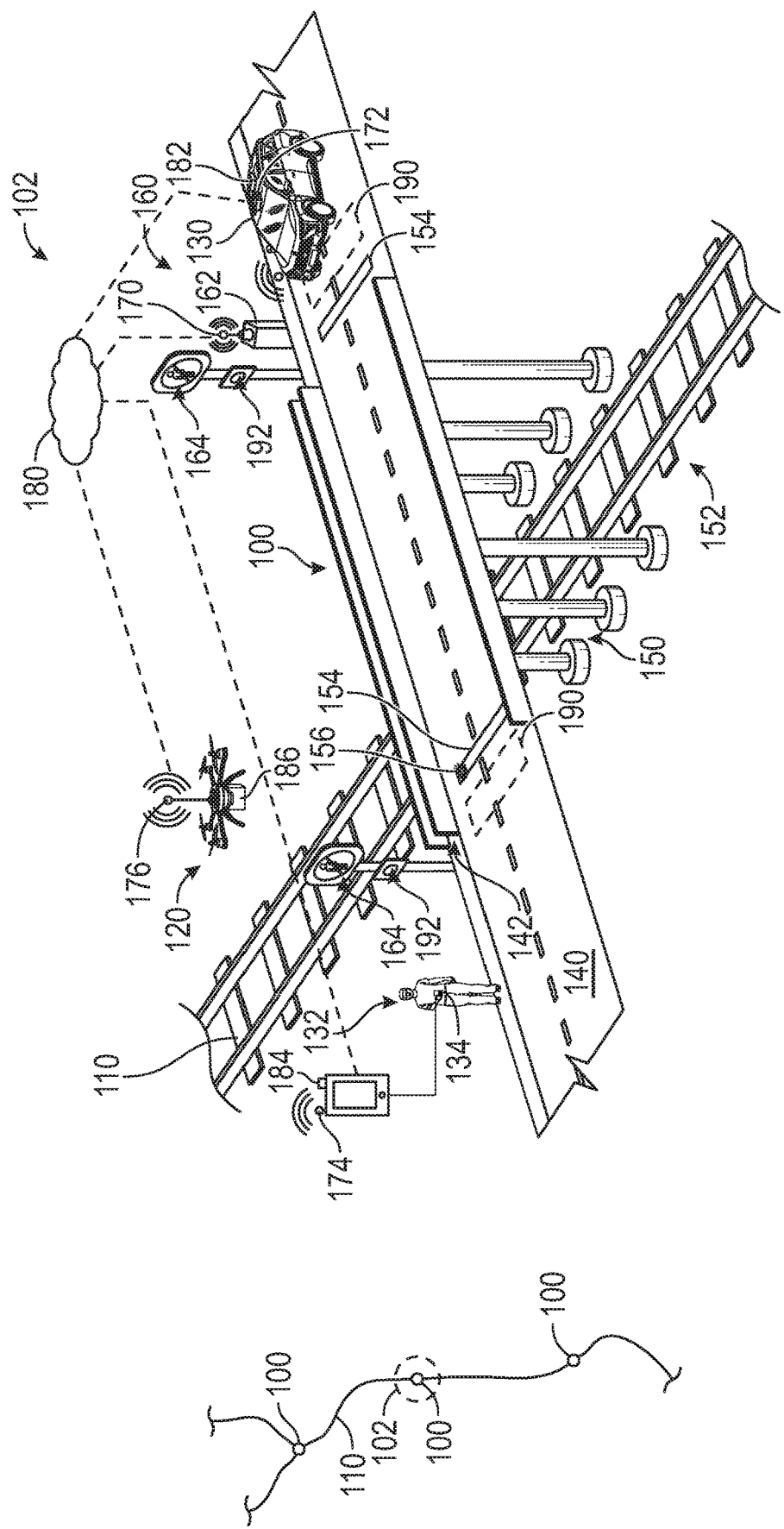

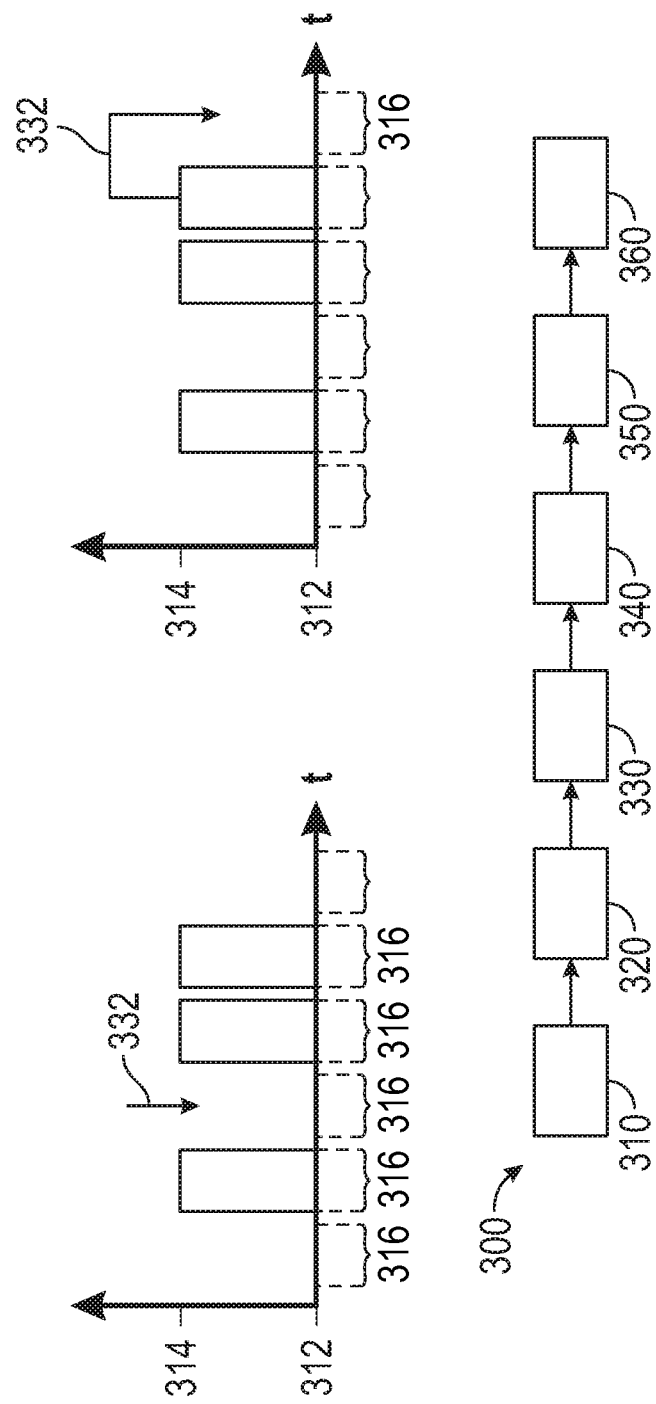

SYSTEMS AND METHODS FOR CONTROLLING AN INTERSECTION OF A ROUTE OF AN UNMANNED AERIAL VEHICLE

BACKGROUND

There is a need for unmanned aerial vehicles (UAVs) or drones to perform a host of functions, including delivering goods, assisting emergency crews, and helping to optimize traffic. However, strict laws regarding drone flight and use have limited the ability to provide many of these functions. For example, drones may not be allowed to operate over a non-participating person or a moving vehicle.

Such restrictions make the use of drones difficult for anyone trying to provide services using drones as it is difficult to determine a flight path that avoids civilization and traffic. Object recognition may be used to recognize objects to avoid persons and vehicles. However, this requires that the drone fly low to the ground and object recognition becomes more difficult at night.

It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 1 illustrates an example plan view of a route of a UAV including intersections.

FIG. 2 is a perspective view of an intersection including a system for controlling the intersection and a vehicle, a mobile device, and a UAV in accordance with the present disclosure.

FIG. 3 is a flow chart and schematic illustration of an example method of controlling the intersection and adjusting an arrival time of a UAV.

DETAILED DESCRIPTION

Overview

The disclosure provides systems and methods for controlling an intersection of a route of a UAV. The systems and methods provide detection of vehicles and persons in (or predicted to enter) an area of the intersection and provide a signal to the UAV so that the UAV can avoid flying over the detected vehicles and persons.

The systems and methods may determine traffic in or predicted to enter an area. The traffic may be determined via communication of location information from vehicles and mobile devices to the system, via connections to the system by vehicles and mobile devices, via object detection systems and sensors, and/or via manual signaling inputs. The system may determine whether the area is or is predicted to be clear or include traffic at different times.

The system communicates the times that the area is or is predicted to be clear to the UAV. Alternatively, the system may broadcast whether the area is currently clear or includes traffic.

The UAV determines an arrival time at the area according to a current location and planned speed profile along the route. The UAV compares the arrival time to the times that the area is or is predicted to be clear. If the area is clear at the time that is the arrival time, the UAV continues through the area according to the planned speed profile. If the area has traffic at the time that is the arrival time, the UAV changes the speed profile so that the arrival time is at a time when the area is clear.

The UAV sends the arrival time to the system. Upon receiving the arrival time from the UAV, the system may signal vehicles and persons (e.g., via mobile devices and/or area infrastructure such as lights or traffic signals (e.g., a stop light)) to remain out of the area at the arrival time or to clear out of the area by the arrival time.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIGS. 1-2 illustrate an intersection 100 of a route 110 of an unmanned aerial vehicle 120 (UAV, e.g., a drone). The intersection 100 includes an area 102 or point along the route 110 where vehicles 130, pedestrians 132 (e.g., with mobile devices 134), cyclists, and the like cross the intersection 100 (e.g., cross over the route 110). For example, absent a system described in further detail below, vehicles 130, pedestrians 132 (e.g., with mobile devices 134), cyclists, and the like may unknowingly cross under the UAV 120 at the intersection 100 as it travels the route 110. The size of the area 102 may be determined based on a distance that is required to be maintained between the route 110 and vehicles or people.

The intersection 100 includes a road 140 for the vehicle 130 and a crosswalk 142 or path for pedestrians 132, cyclists, and the like. The illustrated intersection 100 includes a bridge 150 over a railroad 152. Here, the route 110 may be at least partially defined by the railroad 152. The bridge 150 allows for a person in a vehicle 130, a pedestrian 132, or a cyclist to cross over the railroad 152.

Other intersections 100 may not include a bridge. For example, vehicles 130 may drive directly on a railroad to cross the railroad. Such intersections may include gates 154 and lights 156 that signal for a vehicle 130 to stop as a train moves through the intersection 100. Other routes 110 may be determined by other transportation features.

A system 160 for controlling the intersection 100 of the route 110 of the UAV 120 is now described. The system 160 includes a road-side unit 162 (RSU). The RSU 162 may be in communication with or incorporated into infrastructure at the intersection 100 (e.g., traffic signals, gates 154, lights 156, street lights, municipal cameras, buildings, bridges, etc.) or may be a standalone unit.

The RSU 162 is configured to connect to and communicate with UAVs 120, vehicles 130, and mobile devices 134 via direct connections or via a network 180. For example, each of the UAV 120, the vehicle 130, the mobile device 134, and the RSU 162 include components including a memory, a processor, and a communication module.

A processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

A memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

Memory is computer readable media on which one or more sets of instructions, such as the software for performing the methods of the present disclosure, can be embedded. The instructions may embody one or more of the methods or logic as described herein. The instructions may reside completely, or at least partially, within any one or more of the memory, the computer readable medium, and/or within the processor during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

A communication module 170 of the RSU 162 is configured to communicate with a communication module 172 of a vehicle 130, with a communication module 174 of a mobile device 134, and with a communication module 176 of a UAV 120.

The networks described below illustrate an example communication infrastructure in which the connected devices discussed in various embodiments of this disclosure may communicate. The networks may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The communication modules 170, 172, 174, 176 may include wireless transmission and communication hardware and software that may be disposed in communication with one or more transceivers associated with telecommunications towers and other wireless telecommunications infrastructure to communicate over the networks (e.g., networks 180). Such hardware and software may include, for example, a Navigation (NAV) system for receiving and processing a GPS signal from a GPS, a Bluetooth® Low-Energy Module (BLEM), a Wi-Fi transceiver, an Ultra-Wide Band (UWB) transceiver, and/or other wireless transceivers described in further detail below for using near field communication (NFC) protocols, Bluetooth® protocols, Wi-Fi, Ultra-Wide Band (UWB), and other possible data connection and sharing techniques.

The communication modules 170, 172, 174, 176 may include radios configured to transmit (e.g., broadcast) and/or receive vehicle-to-everything (V2X) signals broadcast from another communication module 170, 172, 174, 176. For example, a communication module provides communication from a vehicle to other vehicles, pedestrians or to fixed objects such as traffic lights in its surroundings.

Cellular vehicle-to-everything (C-V2X) is an implementation of a vehicle-to-everything (V2X) protocol. C-V2X is defined by the 3rd Generation Partnership Project (3GPP) based on cellular modem technology and uses 3GPP standardized 4G LTE or 5G mobile cellular connectivity to send and receive signals. It may use the 5.9 GHz frequency band to communicate or another frequency band as may be officially designated as an intelligent transportation system (ITS) frequency. C-V2X can function without network assistance and has a range that exceeds a mile.

Dedicated Short Range Communication (DSRC) is another implementation of a vehicle-to-everything (V2X) or a car-to-everything (C2X) protocol. Any other suitable implementation of V2X/C2X may also be used. Other names are sometimes used, usually related to a Connected Vehicle program or the like. More information on the DSRC network and how the network may communicate with vehicle hardware and software is available in the U.S. Department of Transportation's Core June 2011 System Requirements Specification (SyRS) report (http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report.

The communication modules 170, 172, 174, 176 may implement the DSRC protocol to directly connect to one another. For example, such protocols may include be pure DSRC, a variation of the IEEE 802.11 wireless standard, and other protocols for wireless communication between vehicles and roadside infrastructure systems, which are integrated with GPS and are based on an IEEE 802.11 protocol for wireless local area networks (such as, 802.11p, etc.).

The communication modules 170, 172, 174, 176 may include radio frequency (RF) hardware configured to transmit and/or receive signals, for example, using a 2.4/5.8 GHz frequency band or the 5.9 GHz frequency band.

The communication modules 170, 172, 174, 176 may include hardware and software for communicate using a Bluetooth or Bluetooth Low Energy (BLE) protocol. For example, the communication modules can include a BLE module (BLEM) that is configured and/or programmed to receive messages from, and transmit messages to, one or more cellular towers associated with a telecommunication provider, and/or and a Telematics Service Delivery Network (SDN). The BLEM may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM may include Generic Attribute Profile (GATT) device connectivity for client devices that respond to or initiate GATT commands and requests.

The communication modules 170, 172, 174, 176 may include wireless network interfaces to enable communication with external networks 180. Such interfaces include hardware (e.g., processors, memory, storage, antenna, etc.) and software to control the wireless network interfaces for the external networks 180. For example, the networks 180 can include standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m), and local area wireless networks (including IEEE 802.11 a/b/g/n/ac or others), etc.). The external networks 180 may be a public network, such as the Internet; a private network, such as an intranet; or combinations thereof, and may utilize a variety of networking protocols now available or later developed including, but not limited to, TCP/IP-based networking protocols.

As an example, the communication module 170 of the RSU 162 may communicate with the communication module 172 of the vehicle 130 via a V2X protocol, with the communication module 174 of the mobile device 134 via a wireless protocol, and with the communication module 176 of the UAV 120 via the V2X protocol or a radio frequency (RF) communication protocol.

Communication technologies described above, such as C-V2X, may be combined with other technologies, such as Visual Light Communications (VLC), Cellular Communications, and short range radar, facilitating the communication of position, speed, heading, relative position to other objects, and the exchange of information with other vehicles, mobile devices, UAVs, RSUs, or external computer systems.

The modules 172, 174, 176 may include a navigation (NAV) systems 182, 184, 186 including global positioning system (GPS) receiver and an inertial navigation system (INS) to share the location of the vehicles 130, the mobile device 134, and the UAV 120. The module 170 may store the location of the RSU 162.

The NAV system 182, 184, 186 is configured and/or programmed to determine a position of the vehicle 130, mobile device 134, or UAV 120. The GPS receiver is configured or programmed to triangulate a position or location relative to satellites or terrestrial based transmitter towers associated with the GPS.

The NAV system 182, 184, 186 may be further configured or programmed to develop routes from a current location to a selected destination (e.g., the intersection 100), display a map and present directions to the selected destination, and determine a time to travel to the selected location and the predicted time of arrival. The system 160 may use such information from the NAV systems 182, 184 to predict traffic in the area 102 at different times.

For example, a respective NAV systems 182, 184, 186 for each of the vehicle 130, mobile device 134, and UAV 120 can determine a route to travel from a current location to the intersection 100 (or location of the RSU 162), an estimated time to reach the intersection 100, and an estimated time of arrival. The estimated time of arrival may be based on the position, speed, and heading or other information determined by the NAV system 182, 184, 186. The system 160 may use such information from the NAV systems 182, 184 to predict traffic in the area 102 at different times.

The UAV 120 may be autonomous and/or remotely directed. For example, the NAV system 186 is configured to determine the route 110 and identify each intersection 100, for example, based on navigational data from a Global Positioning System (GPS) receiver. The NAV system 186 can further determine a speed profile along the route 110 and control steering, lifting, and propelling mechanisms to move the UAV 120 along the route 110 according to the speed profile.

In constructing the route 110, the NAV system 186 may take into account the timing of the route to prevent delays at intersections 100. The NAV system 186 may construct the route 110 using a statistical analysis to determine and minimize the likelihood or probability of a delay along the route 110 by the UAV 120 because of traffic in one or more areas 102.

The system 160 further includes sensors 190 and user interfaces 192. Measurements by the sensors 190 or inputs to the user interfaces 192 may be used to detect the presence of vehicles 130 and pedestrians 132 in the area 102 of the intersection 100. For example, the sensors 190 can include an inductive sensor in the road 140, a pressure plate sensor in the road 140, cameras with object or motion detection software, and the like. The user interfaces 192 can include crosswalk buttons 194 that allow a user to request to cross a crosswalk, other manual push buttons, and signaling extensions that are enabled via a mobile device 134 or another wireless interface (e.g., through BLE or Wi-Fi).

The system 160 is configured to determine or predict the presence of vehicles 130, pedestrians 132, and mobile devices 134 in the area 102 via connections to the RSU 162, communication of information to the RSU 162 (e.g., location and arrival time information), and/or measurements and inputs from the sensors 190 and user interfaces 192.

For example, the sensors 190 make measurements in the area 102 of the intersection 100 and, if the measurements are determined to reflect the presence of a vehicle 130 or a pedestrian 132, the system 160 determines that there are vehicles 130 and/or pedestrians in the area 102. Similarly, user interfaces 192 receive inputs in the area 102 of the intersection 100 and the system 160 determines that there are vehicles 130 and/or pedestrians in the area 102 when an input to a user interface 192 (e.g., crosswalk signal) is received.

If the sensor 190 does not provide measurements that reflect the presence of a vehicle 130 or pedestrian 132 for the entire time the vehicle 130 or pedestrian 132 is in the area 102, the system 160 may start a timer. For example, the system 160 may determine a measurement by an inductive sensor 190 indicates that a vehicle 130 is in the area 102. After the measurement stops (e.g. as the vehicle 130 moves off of the inductive sensor 190 and crosses the bridge 150), the system 160 starts a timer. At the end of the timer, the systems determines that the vehicle 130 is out of the area 102. Similarly, the system 160 may set a timer based on an input to a user interface 192.

The system 160 is also configured to determine the presence of vehicles 130 and mobile devices 134 in the area 102 via connections to the RSU 162. As described above, the mobile devices 134 and vehicles 130 can directly connect to the RSU 162. The RSU 162 can determine, for example, based on the strength of a direct connection, if the mobile device 134 or vehicle 130 is in the area 102.

In addition, the vehicle 130 and the mobile device 134 can provide information (e.g., from NAV systems) to the RSU 162 via direct connections or connections over a network 180. The information can include location, speed, acceleration, heading, and the like. Based on this information, the RSU 162 can determine if the vehicle 130 or the mobile device 134 is in the area 102. For example, the RSU 162 can define the area 102 with a geo-fence and compare the location information to the geo-fence.

The RSU 162 can also predict when a vehicle 130 or mobile device 134 will enter the area 102 based on location, speed, acceleration, and heading information or receive such a prediction from the NAV systems 182, 184.

The RSU 162 is configured to send information to the UAV 120 regarding if and when the area 102 is or predicted to be clear (e.g., no vehicles 130, pedestrians 132, or mobile devices 134 are in the area 102). The NAV system 186 is configured to receive signals from the RSU 162 upstream of the intersection 100.

In response, the UAV 120 may continue according to its speed profile if the area 102 is predicted to be clear at the time the UAV 120 is predicted to move through the area 102 along the route 110. Alternatively, the UAV 120 may accelerate, decelerate, or hover for a time to alter its speed profile in order to move through the area at a time when the area 102 is clear or predicted to be clear and/or deviate from the route whilst maintaining speed (i.e., altering the flight path).

The UAV 120 may communicate the predicted time that the UAV 120 will move through the area 102. In response, the RSU 162 may communicate with the mobile device 134 and the vehicle 130 to stay out of the area 102 or move out of the area 102 during that time. For example, the RSU 162 may control signals 164, gates 154, and lights 156 to signal to vehicles 130 and pedestrians 132 or send messages to the vehicles 130 and mobile devices 134.

Referring to FIG. 3, an exemplary method 300 of controlling the intersection 100 of the route 110 of the UAV 120 is now described. According to a first step 310, the system 160 determines if traffic is in or predicted to enter the area 102. In particular, the system 160 may determine whether the area 102 is or is predicted to be clear 312 or include traffic 314 at different times 316.

According to a second step 320, the system 160 communicates the times 316 that the area 102 is or is predicted to be clear 312 to the UAV 120. According to a third step 330, the UAV 120 determines an arrival time 332 at the area 102 according to current location and planned speed profile along the route 110.

According to a fourth step 340, the UAV 120 compares the arrival time 332 to the times 316 that the area 102 is or is predicted to be clear 312 or include traffic 314. If the area 102 is clear 312 at the time 316 that is the arrival time 332, the UAV 120 continues through the area 102 according to the planned speed profile. Or, the UAV 120 may optimize the speed profile so that the arrival time 332 is at a time 316 when the area 102 is or is predicted to be clear 312.

If the area 102 has traffic 314 at the time 316 that is the arrival time 332, according to a fifth step 350, the UAV 120 changes the speed profile so that the arrival time 332 is at a time 316 when the area 102 is or is predicted to be clear 312. The UAV 120 may make adjustments (e.g., accelerate, decelerate, or stop and hover) at different distances from the area 102 as necessary and within the capabilities of the UAV.

In addition or alternatively, according to a sixth step 360, the UAV 120 sends the arrival time 332 to the system 160. Upon receiving the arrival time 332 from the UAV 120, the system 160 may signal the vehicle 130 and persons (e.g., via mobile devices 134 and/or area infrastructure such as lights or traffic signals) to remain out of the area 102 at the arrival time 332 or to clear out of the area 102 by the arrival time 332.

According to other example methods in accordance with the present disclosure, the UAV may determine intersection clearance via a broadcast from the intersection controller. For example, the intersection controller may simply broadcast location information and either a "clear" or "occupied" designator. Here, the UAV is tuned to receive these messages and only upon receipt of an "occupied" designator does the UAV make calculations/alterations to a flight path/speed profile. Further, instead of an altered speed profile, the UAV may halt flight once a proximity to the intersection controller is reached and resume upon receipt of the "clear" designator.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
    determining that an area of a route of a UAV is clear or not clear, wherein determining that the area is clear or not clear includes determining that at least one of a vehicle and a mobile device is in communication with a control system at the area of the route; and
    providing, based on the area being determined not to be clear, a signal that is configured to be received by an unmanned aerial vehicle (UAV), wherein the signal is configured to be used to change a speed profile or flight path of the UAV.

2. The method of claim 1, wherein determining that the area is clear or not clear includes determining that at least one of a person and a vehicle is detected in a measurement by a sensor, wherein the sensor is in communication with a control system.

3. The method of claim 1, wherein determining that the area is clear or not clear includes determining that a location of at least one of a vehicle and a mobile phone is in the area.

4. The method of claim 3, wherein the location is a GPS location and the area is defined by a geo-fence border.

5. The method of claim 1, wherein determining that the area is clear or not clear includes determining at least one time at which at least one of a vehicle and a mobile device is predicted to be in the area.

6. The method of claim 5, further comprising:
    determining an arrival time at which the UAV is predicted to reach the area along the route; and
    comparing the at least one time at which at least one of a vehicle and a mobile device is predicted to reach the area to the arrival time.

7. The method of claim 6, further comprising determining a new arrival time based on the arrival time being a time at which at least one of the vehicle and the mobile device is predicted to be in the area.

8. The method of claim 7, further comprising providing the new arrival time to a control system.

9. The method of claim 8, further comprising controlling at least one traffic signal at the intersection to display a stop symbol at least during the new arrival time.

10. The method of claim 8, further comprising sending a message or instruction to at least one of a vehicle and a mobile device to stop outside the area at least during the new arrival time.

11. A system, comprising:
    a road-side unit at an intersection of a route of an unmanned aerial vehicle (UAV), comprising:
        a processor;
        a memory, comprising instructions that, when executed by the processor, causes the processor to:
            determine if an area at an intersection of a route of a UAV is clear, wherein determining that the area is clear or not clear includes determining that at least one of a vehicle and a mobile device is in communication with the road-side unit; and
            provide, based on the determination, a signal that is configured to be received by an unmanned aerial vehicle (UAV), wherein the signal is configured to be used to change a speed profile or flight patch of the UAV if the area is determined not to be clear.

12. The system of claim 11, wherein the road-side unit is configured to connect to at least one of a vehicle and a mobile phone.

13. The system of claim 11, further comprising at least one sensor for detecting a presence of at least one of a person and a vehicle in the area.

14. The system of claim 11, wherein determining if the area is clear includes determining at least one time at which at least one of a vehicle and a mobile device is predicted to be in the area.

15. The system of claim 11, further comprising:
    determining an arrival time at which the UAV is predicted to reach the area along the route; and
    comparing the at least one time at which at least one of a vehicle and a mobile device is predicted to reach the area to the arrival time.

16. The system of claim 15, the memory comprising instructions that, when executed by the processor, causes the processor to control the at least one traffic signal at least during a time at which the UAV is predicted to move through the area along the route.

17. The system of claim 16, wherein the at least one traffic signal is controlled to display a stop symbol.

18. The system of claim 11, the memory comprising instructions that, when executed by the processor, causes the processor to send a message or instruction to at least one of a vehicle and a mobile device to stop outside the area at least during a time that the UAV is predicted to move through the area along the route.

* * * * *